US012594901B2

(12) United States Patent
Tautschnig et al.

(10) Patent No.: US 12,594,901 B2
(45) Date of Patent: Apr. 7, 2026

(54) GAS GENERATOR

(71) Applicant: ZF AIRBAG GERMANY GMBH, Aschau a. Inn (DE)

(72) Inventors: Georg Tautschnig, Vilsbiburg (DE); Rolf Ruckdeschel, Heldenstein (DE)

(73) Assignee: ZF AIRBAG GERMANY GMBH, Aschau A. Inn (DE)

( * ) Notice: Subject to any disclaimer, the term of this patent is extended or adjusted under 35 U.S.C. 154(b) by 0 days.

(21) Appl. No.: 18/720,881

(22) PCT Filed: Nov. 28, 2022

(86) PCT No.: PCT/EP2022/083397
§ 371 (c)(1),
(2) Date: Jun. 17, 2024

(87) PCT Pub. No.: WO2023/117306
PCT Pub. Date: Jun. 29, 2023

(65) Prior Publication Data
US 2025/0145106 A1 May 8, 2025

(30) Foreign Application Priority Data
Dec. 20, 2021 (DE) ..................... 10 2021 133 826.3

(51) Int. Cl.
B60R 21/272 (2006.01)
F42B 3/04 (2006.01)

(52) U.S. Cl.
CPC ............ B60R 21/272 (2013.01); F42B 3/045 (2013.01)

(58) Field of Classification Search
USPC ................................... 102/530–531; 280/741
See application file for complete search history.

(56) References Cited

U.S. PATENT DOCUMENTS

| | | | | |
|---|---|---|---|---|
| 4,249,673 A | * | 2/1981 | Katoh | ....................... F23B 7/00 222/3 |
| 5,655,790 A | | 8/1997 | Faigle et al. | |
| 7,390,019 B2 | * | 6/2008 | Gotoh | ................... B60R 21/272 280/736 |
| 2005/0189750 A1 | | 9/2005 | Gotoh | |

FOREIGN PATENT DOCUMENTS

DE 102019100623 A1 7/2020

OTHER PUBLICATIONS

International Search Report for corresponding Application Serial No. PCT/EP2022/083397, mailed Mar. 3, 2023, pp. 1-5.

\* cited by examiner

*Primary Examiner* — Reginald S Tillman, Jr.
(74) *Attorney, Agent, or Firm* — Tarolli, Sundheim, Covell & Tummino LLP

(57) ABSTRACT

The invention shows a gas generator comprising a pressure chamber (22) filled with compressed gas which is sealed against an environment of the gas generator (10) by a membrane (16), a solid propellant (30) received in the pressure chamber (22), and an igniter unit (14) adjacent to the pressure chamber (22). The solid propellant (30) is surrounded by a cage-type open fuel holder (32) receiving the same which protrudes into the pressure chamber (22) and is directly adjacent to the igniter unit (14). Accordingly, the pressure chamber (22) is free from solid propellant outside the fuel holder (32).

9 Claims, 1 Drawing Sheet

GAS GENERATOR

RELATED APPLICATIONS

This application is a U.S. National Stage Application filed under 35 USC 371, claiming priority to Serial No. PCT/EP2022/083397, filed on 28 Nov. 2022; which claims priority from Patent Application 10 2021 133 826.3, filed 20 Dec. 2021, the entireties of which are hereby incorporated herein by reference.

The invention relates to a gas generator, specifically for a safety device in vehicles, comprising a pressure chamber filled with compressed gas which is sealed against an environment of the gas generator by a membrane, a solid propellant received in the pressure chamber, wherein the compressed gas is in direct contact with the solid propellant before the gas generator is activated, and an ignition unit adjacent to the pressure chamber by which the solid propellant can be ignited when the gas generator is activated.

Gas generators supply gas for filling an airbag or for driving a belt tensioner, for example.

In known hybrid gas generators, the escaping gas is mostly a pressurized gas stored in the housing of the gas generator. The housing is opened by an igniter igniting a pyrotechnical solid propellant. The membrane is destroyed so that the gas can escape.

The pyrotechnical solid propellants are balanced mixtures of solid organic or inorganic fuels and oxidants which usually contain nitrogen and carbon. Pyrotechnical solid propellants must be brought into an appropriate shape such as pellets, extrudates and granules of most diverse geometry to control the burning characteristic. As a result, manufacture and logistics of pyrotechnical solid propellants are expensive, wherein strict safety regulations have to be observed for handling and storage of the propellants.

From DE 10 2019 100 623 A1 furthermore alternative solid propellants are known which are composed of one or more fibers and thus form a gas-permeable fuel body. It has turned out that fuel bodies made from one or more fibers have a sufficiently large surface and, therefore, an extremely good burning characteristic.

The invention searches for optimized solutions to position the solid propellant, specifically the alternative solid propellant made from one or more fibers, inside the gas generator in a simple, quick and cost-effective manner.

Therefore, it is the object of the present invention to develop a gas generator so that the solid propellant is positioned in a stable and safe manner in front of the igniter unit. Further, the gas generator is intended to be manufactured in a simple and cost-effective manner.

According to the invention, the object is achieved by a gas generator of the above-mentioned type, with the solid propellant being surrounded by a cage-type open fuel holder receiving the solid propellant. The fuel holder protrudes into the pressure chamber and is directly adjacent to the igniter unit, the pressure chamber being free from solid propellant outside the fuel holder. In other words, in the pressure chamber a solid propellant is provided exclusively inside the fuel holder so that outside the fuel holder the pressure chamber is free from solid propellant. In this way, the solid propellant is safely positioned directly in front of the igniter unit. Moreover, the pressure gas optimally surrounds the solid propellant, because the fuel holder has a cage-like and, thus, open design.

According to a variant, the solid propellant is a gas-permeable fuel body. The afore-described cage-type open structure of the fuel holder is particularly well suited for gas-permeable fuel bodies, as the hot gas resulting from burning can flow immediately into the remaining pressure chamber. The interstices or pores of the fuel body are filled with the compressed gas, causing the finely spread solid propellant to be always located in direct vicinity of the compressed gas. Thus, in the case of activation of the igniter unit, very rapid reaction of the solid propellant with the compressed gas is achieved.

Advantageously, the gas-permeable fuel body is formed of one or more fibers. Fibers, such as in the form of a fabric, a wadding or any other textile material, have a particularly good burning characteristic, as they have a specifically large inner surface in the pores and interstices. Tests have shown that extremely powerful gas generators can be manufactured by the cage-type open fuel holder in combination with the fibrous fuel body.

According to an embodiment of the invention, the fuel holder is fastened to the igniter unit. In this way, on the one hand, the solid propellant optimally can be adjacent directly to the igniter unit and, on the other hand, this permits the design of a simple fuel holder.

One configuration provides that the fuel holder is detachably fastened to the igniter unit so that, after the igniter unit is activated, it can be detached from the latter and can be moved toward the membrane. Accordingly, the fuel holder including the solid propellant fastened thereto can move, after being ignited, with the generated gas flow toward a discharge opening of the gas generator. In other words, after the igniter unit is activated, the fuel holder detaches and "flies" in the direction of the membrane. This allows for a relatively low flow rate due to the generated gas flow on the surface of the solid propellant, thus preventing the ignited solid propellant from being extinguished, also known as "blowing out" in common parlance.

Advantageously, the igniter unit protrudes fingerlike into the pressure chamber and is spaced at least in portions from a circumferential wall of an outer housing of the gas generator. Concretely, a major part of the axial longitudinal extension of the igniter unit is radially spaced apart from the circumferential wall of the outer housing of the gas generator. In particular, 50 to 90 percent, preferably 60 to 80 percent, of the axial longitudinal extension of the igniter unit protrude into the outer housing of the gas generator. Accordingly, the advantage resides in an even better flow around the fuel holder and, thus, the solid propellant received therein, as the solid propellant is surrounded free from the compressed gas and this is not impeded by the circumferential wall.

Another configuration provides the fuel holder to be attached externally onto the igniter unit. Accordingly, a corresponding mount between the fuel holder and the igniter unit can be selected so that, when or after the gas generator is activated, the fuel holder can detach from the igniter unit or, alternatively, remains tightly connected to the igniter unit. The attachment can include specifically a form closure, such as by the fuel holder engaging in the igniter unit, and/or a force closure, such as by press-fit between the igniter unit and the fuel holder. This helps save additional auxiliary means such as an adhesive.

According to a further embodiment, the fuel holder is made from wire. In particular, the fuel holder can be a cylindrical and/or conical coil spring. Wire offers the advantage that it can be easily processed by being bent into the desired shape. A fuel holder made from wire thus can be manufactured cost-effectively. While cylindrical coil springs lend themselves to safe mounting of the fuel holder to the remaining parts of the gas generator, such as an igniter unit, a conical coil spring allows for a different outflow or a different optimized outflow behavior of the hot gas from the fuel holder.

In a configuration variant of the invention, on a side of the fuel holder opposite to the igniter unit, the fuel holder includes a bent wire end which is bent toward a centerline of the fuel holder. As already by means of the conically designed coil spring, also by this measure the solid propellant can be axially secured against slipping out of the fuel holder. If the fuel holder is in the form of a conical coil spring, the bent wire end is bent even more strongly toward the centerline than the windings of the conical coil spring are already bent anyway so as to provide an axial securing for the solid propellant that can be loaded even more strongly.

In particular, the wire has a round cross-section or is a flat wire. Round wires and flat wires are very popular semi-finished goods in technical fields of application other than gas generators, which is why they can be acquired at very low cost.

All outer faces of the fuel holder, specifically along its outer periphery, can be provided to be gas-permeable. In practice, it has turned out that extremely good results can be achieved in this way. The gas-permeable outer faces enable the hot gas to escape uniformly.

In the following, the invention shall be illustrated by means of two embodiments shown in the attached drawings, wherein.

Figure 1:
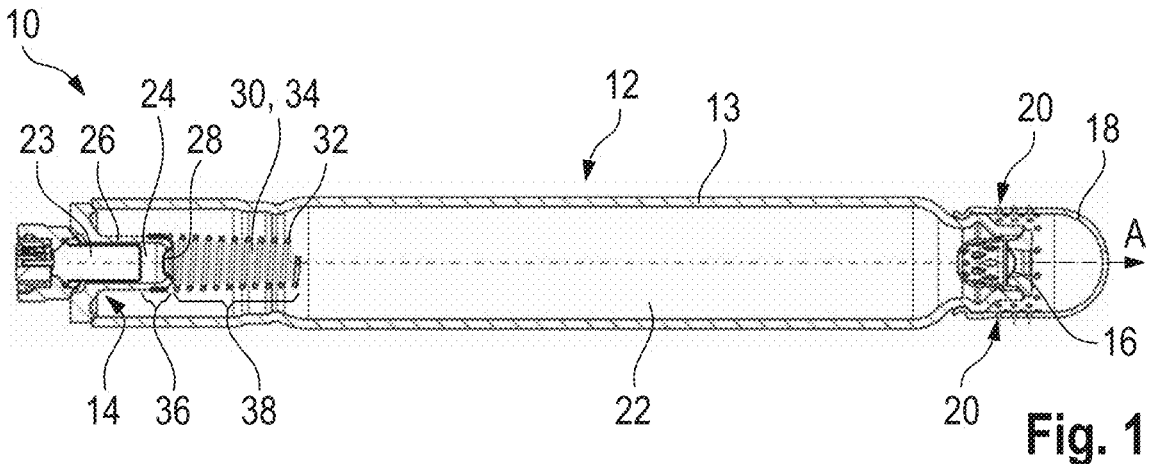
FIG. 1 shows a gas generator according to the invention as set forth in an embodiment in a section view.

FIG. 1 illustrates a first embodiment of a gas generator 10 according to the invention, also referred to as tubular gas generator. The gas generator 10 includes an elongate cylindrical outer housing 12 having a circumferential wall 13 at the first axial end of which an igniter unit 14 of standard design is provided, and at the second axial end of which the outer housing 12 is sealed against the environment of the gas generator 10 by a membrane 16.

A preferably thrust-neutral diffuser 18 provided with exhaust ports 20 is connected to the outer housing 12 in the axial direction A and directs the gas flowing out of the diffusor 18 to the safety device to be activated (not shown). The safety device can be operated in this way. If the safety device is an airbag, said airbag can be inflated.

The outer housing 12 defines a pressure chamber 22 which is adjacent to the igniter unit 14 in the axial direction A. The pressure chamber 22 is filled with a compressed gas. The compressed gas comprises a gaseous oxidant, in this case oxygen.

The igniter unit 14 extends fingerlike, i.e. pin-shaped, into the pressure chamber 22 and is spaced apart from the circumferential wall 13 so that a corresponding annular section of the pressure chamber 22 forms and extends, respectively, around the igniter unit 14. Concretely, the igniter unit 14 can be fastened to a front opening of the outer housing 12, specifically by means of a peripheral weld seam.

Just as the membrane 16, also the igniter unit 14 seals the pressure chamber 22 in a pressure-tight and gas-tight manner against the environment of the gas generator 10.

Inside the igniter unit 14, an igniter 23 is separated from the pressure chamber 22 in a pressure-tight and gas-tight manner. For this purpose, a front opening 24 in an igniter housing 26 of the igniter unit 14 in which the igniter 23 is accommodated, is sealed toward the pressure chamber 22 by an igniter membrane 28. Concretely, the igniter 23 may be accommodated in a holder, the holder being fastened, specifically welded, to the opening of the igniter housing 26 opposite to the front opening 24.

In the pressure chamber 22, a solid propellant 30 is received by a cage-type open fuel holder 32. Hence, the solid propellant 30 and the fuel holder 32 are formed separately from each other.

The solid propellant 30 is a single gas-permeable fuel body 34 made from plural fibers, e.g. in the form of a truncated cone, which is disposed inside the pressure chamber 22.

As the reaction of the gas-permeable fuel body 34 composed of fibers with oxygen supplies also a reaction heat which is significantly higher than during reaction of a typical pyrotechnical solid propellant, already very small amounts of the gas-permeable fuel body 34 are sufficient to release the energy required to heat the compressed gas and/or to generate an excess pressure and/or to generate or increase a shock wave in the pressure chamber 22 for destroying the membrane 16.

The fuel holder 32 including the fuel body 34 is attached to the outside of the igniter unit 14. The fuel holder 32 therefore has the purpose to position the fuel body 34 stationarily in the pressure chamber.

Figures 3A, 3B, 3C:
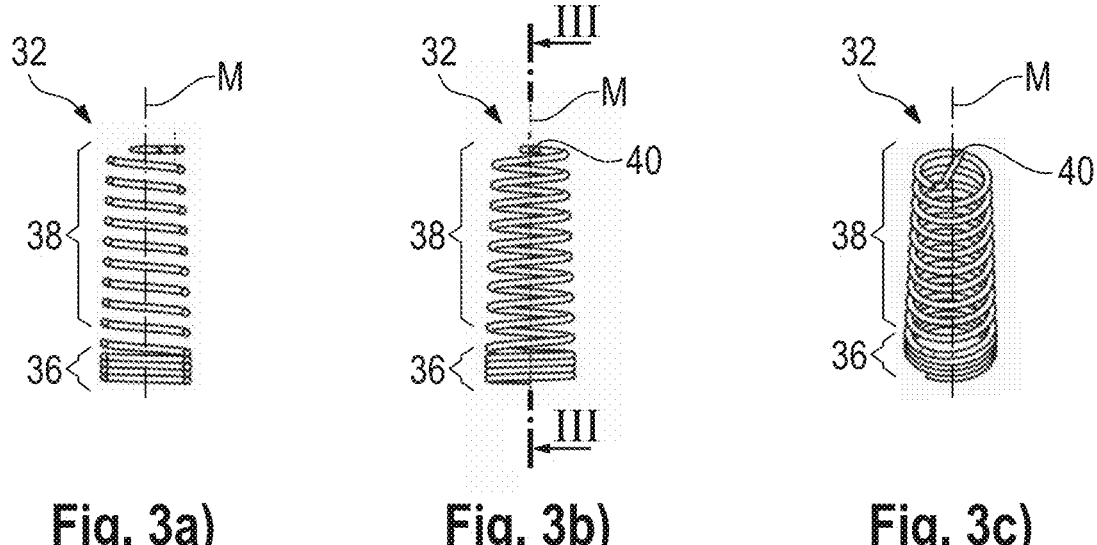
FIGS. 3a to 3c show different views of a fuel holder of the gas generators according to the invention from FIGS. 1 and 2.

As is evident from FIGS. 3a to 3c, the fuel holder 32 in this case is a coil spring formed of wire and having a round cross-section which is gas-permeable between the windings.

Moreover, the fuel holder 32 has a first section 36 and a second section 38. While the wire in the first section 36 takes the shape of a cylindrical coil spring, the wire in the second section 38 takes the shape of a conical coil spring.

The two sections merge integrally. This means that the fuel holder 32 in total is formed integrally.

In addition, the individual wire windings of the fuel holder 32 in the first section 36 in portions are directly superimposed and thus contact each other, wherein they can also be very close to one another, causing the first section to be less elastic compared to the second section 38 in which the individual wire windings are spaced apart from each other.

The less elastic first section 36 serves to fasten the fuel holder 32 to the igniter housing 26 in a simple and stable manner (see FIG. 1). The increased stiffness can help attach the first section 36 more easily onto the outside of the igniter unit 14, i.e. onto the igniter housing 26. In addition, a comparatively small attachment length is required, as the wire windings are close to one another or are directly on top of each other, resp., and a low radial flexibility is reached.

With respect to the activation of the gas generator 10, when designing the fuel holder 32, it is further ensured that the first section 36 can be smoothly attached onto the igniter unit 14. This is achieved by a smooth-running press-fit between the outer face of the igniter housing 26 and the inner diameter of the fuel holder 32 in the first section 36. As a result, the fuel holder 32 can detach, after being activated, by the flowing compressed gas from the igniter unit 14 and can move toward the opened membrane 16.

The second section 38 has the function to receive the fuel body 34 and/or to position it in a relatively fixed position within the gas generator 10.

By attaching the first section 36 onto the igniter housing 26, the fuel body 34 is directly adjacent to the igniter unit 14. The pressure chamber 22 outside the fuel holder 32 is free from solid propellant, i.e. exclusively compressed gas is present here.

Moreover, the fuel body 34 in the form of a truncated cone can be inserted optimally into the conical coil spring of the second section 38. It is conceivable that the fuel body 34 is pressed into the fuel holder 32, for example, and/or is provided already prior to mounting into the fuel holder as a prefabricated unit, specifically as a pre-pressed molding.

Optionally the fuel body 34 can be axially biased in the coil spring elastic in the axial direction on the one hand by the fuel body 34 abutting against the igniter unit 14 and, on the other hand, by the shape of the truncated cone and the cylindrically designed coil spring.

In addition, the fuel holder 32 in the second section 38 has an inwardly bent wire end 40 which is bent toward a centerline M of the fuel holder 32 (see FIGS. 3b and 3c). Accordingly, the bent wire end 40 is bent further toward the centerline M than the second section 38 in the form of the conical coil spring is already bent anyway. This provides for additional securing and, resp., a corresponding mechanical abutment in the axial direction A.

Since the gas-permeable fuel body 34 has a relatively high compression hardness, it is possible to press the gas-permeable fuel body 34 into the fuel holder 32 and to compress it in the axial and radial directions so that the gas-permeable fuel body 34 is retained in the fuel holder by force closure. Accordingly, the conical shape of the truncated cone by which the fuel body 34 can be easily inserted into the fuel holder 32 and the clamping effect does not occur before the fuel body 34 is inserted completely or almost completely has a supporting effect.

In the following, the activation of the gas generator 10 shall be briefly discussed for better understanding.

When the gas generator 10 is activated, the igniter unit 14 receives an electric signal to ignite the igniter 23.

The sudden increase in pressure inside the igniter unit 14 and/or hot particles initially destroy the igniter membrane 28. After that, the gas-permeable fuel body 34 is ignited and/or activated in the pressure chamber 22 by the hot gas and/or particles released by the igniter unit 14. The heat development occurring during this reaction heats the compressed gas so that excess pressure is formed. Said excess pressure helps open the membrane 16 and the heated compressed gas can flow out of the pressure chamber 22 through the exhaust ports 20 of the diffuser 18 into the environment and can actuate a safety device, for example. It is also possible that a shockwave is generated by the abrupt destruction of the igniter membrane 28, which shockwave propagates and/or correspondingly moves at very high speed, preferably at supersonic speed, along the longitudinal axis through the pressure chamber to open the membrane 16 merely by the effect of the shockwave itself. In conclusion, the membrane 16 can be opened both only by appropriate formation of the shockwave and only by formation of excess pressure.

Figure 2:
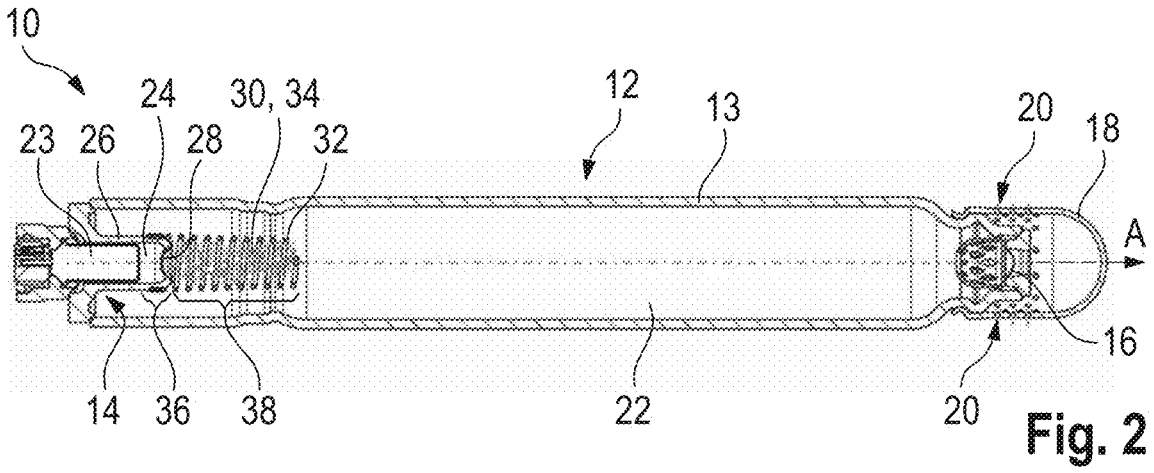
FIG. 2 shows a gas generator according to the invention as set forth in a further embodiment in a section view.

FIG. 2 depicts another embodiment of a gas generator 10 according to the invention. It is different from the above-described embodiment according to FIG. 1 in that the gas-permeable fuel body 34 now is formed of plural fibers in the form of a fiber ball and does no longer take the shape of a truncated cone.

However, it is also conceivable that the fuel body 34 includes any other fiber array such as a regular fiber array, as it occurs in a textile material.

All above-described properties and functionalities of the afore-described embodiment according to FIG. 1 which at the same time do not necessarily require the conical shape of the fuel body 34 are also applicable to the embodiment according to FIG. 2.

Thus, the fuel body 34 is pressed, as before, into the second section 38 of the fuel holder 32.

In this case, the fuel body 34 is secured in the axial direction primarily by the bent wire end 40 and by the abutment against the igniter unit 14.

The invention claimed is:

1. A gas generator, specifically for a safety device in vehicles, comprising:

a pressure chamber filled with compressed gas which is sealed against an environment of the gas generator by a membrane, a solid propellant received in the pressure chamber, the compressed gas being in direct contact with the solid propellant, before the gas generator is activated, and an igniter unit adjacent to the pressure chamber by which the solid propellant can be ignited, when the gas generator is activated, wherein the solid propellant is surrounded by a fuel holder receiving the same which protrudes into the pressure chamber and is directly adjacent to the igniter unit, wherein the pressure chamber is free from solid propellant outside the fuel holder, and wherein the fuel holder is formed of wire and is designed as a cylindrical and/or conical coil spring.

2. The gas generator according to claim 1, wherein the solid propellant is a gas-permeable fuel body.

3. The gas generator according to claim 2, wherein the gas-permeable fuel body is formed of one or more fibers.

4. The gas generator according to claim 1, wherein the fuel holder is fastened to the igniter unit.

5. The gas generator according to claim 4, wherein the fuel holder is detachably fastened to the igniter unit so that, after the igniter unit is activated, the fuel holder can be detached from the igniter unit and can be moved toward the membrane.

6. The gas generator according to claim 4, wherein the igniter unit protrudes fingerlike into the pressure chamber and is spaced, at least in portions, from a circumferential wall of an outer housing of the gas generator.

7. The gas generator according to claim 4, wherein the fuel holder is attached to the outside of the igniter unit.

8. The gas generator according to claim 1, wherein the fuel holder includes, on a side of the fuel holder opposite to the igniter unit, a bent wire end which is bent toward a centerline of the fuel holder.

9. The gas generator according to claim 2, wherein all outer faces of the fuel holder, specifically along its outer periphery, are gas-permeable, wherein the fuel body and the fuel holder are formed separately.

* * * * *